(12) United States Patent
Zhou et al.

(10) Patent No.: US 10,706,282 B2
(45) Date of Patent: Jul. 7, 2020

(54) METHOD AND MOBILE TERMINAL FOR PROCESSING IMAGE AND STORAGE MEDIUM

(71) Applicant: GUANGDONG OPPO MOBILE TELECOMMUNICATIONS CORP., LTD., Dongguan, Guangdong (CN)

(72) Inventors: Haitao Zhou, Dongguan (CN); Yibao Zhou, Dongguan (CN); Cheng Tang, Dougguan (CN); Xueyong Zhang, Dougguan (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 109 days.

(21) Appl. No.: 16/034,150

(22) Filed: Jul. 12, 2018

(65) Prior Publication Data
US 2019/0019027 A1 Jan. 17, 2019

(30) Foreign Application Priority Data
Jul. 17, 2017 (CN) .......................... 2017 1 0582853

(51) Int. Cl.
*G06K 9/00* (2006.01)
*G06K 9/46* (2006.01)
*G06K 9/52* (2006.01)

(52) U.S. Cl.
CPC ....... *G06K 9/00617* (2013.01); *G06K 9/0061* (2013.01); *G06K 9/00604* (2013.01); *G06K 9/4652* (2013.01); *G06K 9/527* (2013.01)

(58) Field of Classification Search
CPC .......... G06K 9/00617; G06K 9/00604; G06K 9/527; G06K 9/4652; G06K 9/0061; G06K 9/00597; H04N 9/735; H04N 5/2354; G06F 21/32
See application file for complete search history.

(56) References Cited

U.S. PATENT DOCUMENTS

| 8,345,936 B2 | 1/2013 | Burge |
| 9,848,113 B2 | 12/2017 | Smits et al. |
| 2003/0007687 A1 | 1/2003 | Nesterov |

(Continued)

FOREIGN PATENT DOCUMENTS

| CN | 101339653 A | 1/2009 |
| CN | 103116741 A | 5/2013 |

(Continued)

OTHER PUBLICATIONS

First Office Action of the European application No. 18181109.2, dated Oct. 2, 2019.

(Continued)

*Primary Examiner* — Brandon J Miller
(74) *Attorney, Agent, or Firm* — Ladas & Parry, LLP

(57) ABSTRACT

Disclosed are a method and mobile terminal for processing an image and storage medium. The method includes collecting color information of a target object; determining at least one of multiple pre-stored compensation parameters as at least one compensation parameter corresponding to the color information; and during iris collection, compensating an iris based on the at least one target compensation parameter to obtain a color iris image.

12 Claims, 6 Drawing Sheets

(56) References Cited

U.S. PATENT DOCUMENTS

| | | | | |
|---|---|---|---|---|
| 2006/0245643 | A1* | 11/2006 | Bloom | G06K 9/0061 |
| | | | | 382/167 |
| 2009/0279790 | A1 | 11/2009 | Burge | |
| 2009/0290048 | A1* | 11/2009 | Kakiuchi | H04N 1/62 |
| | | | | 348/241 |
| 2011/0274347 | A1* | 11/2011 | Cheng | G06T 7/12 |
| | | | | 382/165 |
| 2015/0304535 | A1 | 10/2015 | Smits et al. | |
| 2016/0274659 | A1* | 9/2016 | Caraffi | G06F 3/013 |
| 2017/0039411 | A1* | 2/2017 | Ono | G06K 9/00255 |
| 2019/0019024 | A1* | 1/2019 | Zhou | G06K 9/00899 |

FOREIGN PATENT DOCUMENTS

| | | | |
|---|---|---|---|
| CN | 103598885 | A | 2/2014 |
| CN | 103886282 | | 6/2014 |
| CN | 105874472 | A | 8/2016 |
| CN | 106503680 | A | 3/2017 |
| CN | 107454339 | A | 12/2017 |
| WO | 2015127313 | A1 | 8/2015 |
| WO | 2015200247 | A1 | 12/2015 |

OTHER PUBLICATIONS

Stephen M. Pizer et al: "Adaptive histogram equalization and its variations", Computer Vision, Graphics, and Image Processing, vol. 39, No. 3, Sep. 1, 1987(Sep. 1, 1987), pp. 355-368, XP055534117, US ISSN: 0734-189X, DOI: 10.1016/S0734-189X(87)80186-X.

International Search Report in international application No. PCT/CN2018/095561 dated Sep. 26, 2018.
Written Opinion of the International Search Authority in international application No. PCT/CN2018/095561 dated Sep. 26, 2018.
Office Action mailed for corresponding Chinese Application No. 201710582853.4 dated Apr. 17, 2019.
Decision to grant a patent mailed for corresponding Chinese Application No. 201710582853.4 dated Jun. 28, 2019.
Supplementary European Search Report and Search Opinion in European application No. 18181109.2, dated Dec. 11, 2018.
Shamsafar, et al: "Fusing the information in visible light and near-infrared images for ins recognition", Machine Vision and Applications, Springer Verlag, DE, vol. 25, No. 4, Nov. 12, 2013 (Nov. 12, 2013), pp. 881-899.
Tajbakhsh, et al: "Feature fusion as a practical solution toward noncooperative iris recognition", Information Fusion, 2008 11TH International Conference on, IEEE, Piscataway, NJ, USA, Jun. 30, 2008 (Jun. 30, 2008), pp. 1-7.
Uhl, et al: "Multi-stage Visible Wavelength and Near Infrared Iris Segmentation Framework", Jun. 25, 2012 (Jun. 25, 2012), Image Analysis and Recognition, Springer Berlin Heidelberg, Berlin, Heidelberg, pp. 1-10.
Burt P Jet Al:"Enhanced image capture through fusion", Computer Vision, 1993. Proceeoings., Fourth International Conference 0 N Berlin, Germany May 11-14, 1993, Los Alamitos, CA, USA.IEEE Computer SOCI, May 11, 1993 (May 11, 1993), pp. 173-182, XP010128631, DOI: 10.1109/ICCV.1993.378222 ISBN: 978-0-8186-3870-1.
Notice of oral proceedings of the European application No. 18181109.2, dated Mar. 30, 2020.

* cited by examiner

METHOD AND MOBILE TERMINAL FOR PROCESSING IMAGE AND STORAGE MEDIUM

TECHNICAL FIELD

The disclosure relates to the technical field of mobile terminals, and in particular to a method and mobile terminal for processing an image and storage medium.

BACKGROUND

With the increasing popularization and application of mobile terminals such as mobile phones, tablet computers, mobile terminals are able to support more and more applications and become more powerful. The mobile terminals develop towards diversification and individuation and have become indispensable electronic products in the lives of users.

Currently, iris recognition is increasingly favored by manufacturers of mobile terminals. Iris images currently collected are all infrared images. In many cases, users prefer to watch color images. Therefore, the display effect is not good.

SUMMARY

In a first aspect, an embodiment of the disclosure provides a method for processing an image, which includes the operations as follows. Color information of a target object is collected. At least one of multiple pre-stored compensation parameters is determined as at least one target compensation parameter corresponding to the color information. During iris collection for the target object, an iris is compensated based on the at least one target compensation parameter to obtain a color iris image.

In a second aspect, an embodiment of the disclosure provides a mobile terminal, which includes an iris recognition device, a memory and an Application Processor (AP), both the iris recognition device and the memory being connected to the AP. The iris recognition device is configured to collect color information of a target object. The memory is configured to store multiple compensation parameters. In a third aspect, an embodiment of the disclosure provides a computer-readable storage medium, wherein the computer-readable storage medium is configured to store a computer program, the computer program enabling a computer to execute some or all operations described in the first aspect of the embodiment of the disclosure.

BRIEF DESCRIPTION OF DRAWINGS

In order to more clearly illustrate the technical solutions in the embodiments of the disclosure or the conventional art, accompanying drawings needing to be used in the descriptions of the embodiments or the conventional art will be simply introduced hereinbelow. It is apparent that the drawings described hereinbelow are merely some embodiments of the disclosure. Without making creative works, a person of ordinary skill in the art may also obtain other drawings according to these drawings.

DETAILED DESCRIPTION

Figure 1A:
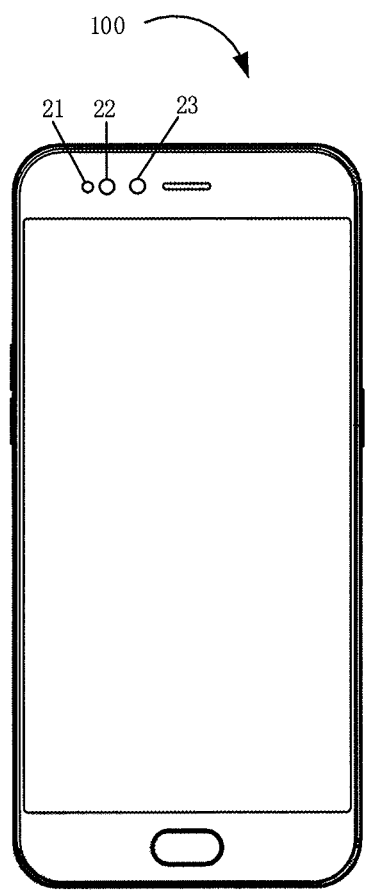
FIG. 1A is a schematic diagram illustrating configuration of a smart phone according to an embodiment of the disclosure.

In order to make a person skilled in the art better understand the solutions of the disclosure, the technical solutions in the embodiments of the disclosure will be clearly and completely described hereinbelow with reference to the drawings in the embodiments of the disclosure. It is apparent that the described embodiments are only a part of the embodiments of the disclosure, not all of the embodiments. On the basis of the embodiments of the disclosure, all other embodiments obtained on the premise of no creative work of a person skilled in the art will fall within the scope of protection of the disclosure.

The specification and claims of the disclosure and terms "first", "second" and the like in the drawings are used for distinguishing similar objects rather than describing a specific sequence. In addition, terms "include" and "have" and any inflexions thereof are intended to cover non-exclusive inclusions. For example, processes, methods, systems, products or devices containing a series of operations or units are not limited to operations or units which have been already listed, and other operations or units which are not listed or are inherent to these processes, methods, products or devices are alternatively included instead.

Mentioning of "embodiments" in the disclosure means that specific features, structures or characteristics described in the embodiments may be included in at least one embodiment of the disclosure. The phrase occurring at each position in the specification is not always the same embodiment, or not an independent or alternative embodiment mutually exclusive to other embodiments. A person skilled in the art explicitly and implicitly understands that the embodiments described in the disclosure may be combined with other embodiments.

The embodiments of the present disclosure disclose at least the following solutions.

Solution 1. A method for processing an image, comprising: collecting color information of a target object; determining at least one of a plurality of pre-stored compensation parameters as at least one compensation parameter corresponding to the color information; and compensating, during iris collection for the target object, an iris based on the at least one target compensation parameter to obtain a color iris image.

Solution 2. The method of solution 1, wherein the determining at least one of a plurality of pre-stored compensation parameters as at least one compensation parameter corresponding to the color information comprises: analyzing the color information to obtain abnormal color information; determining a target characterization color corresponding to the abnormal color information, the target characterization color indicating real color information of a region of the target object having the abnormal color information; and determining at least one of the plurality of compensation parameters as at least one compensation parameter corresponding to the target characterization color according to predetermined correspondences between characterization colors and compensation parameters.

Solution 3. The method of solution 1, wherein the compensating, during iris collection, an iris based on the at least one target compensation parameter to obtain a color iris image comprises: performing, by a visible light camera, image collection on the target object according to the at least one target compensation parameter to obtain a visible light image; performing, by an infrared camera, image collection on the target object to obtain an infrared image under illumination of an infrared fill light; and combining the visible light image and the infrared image to obtain the color iris image.

Solution 4. The method of solution 3, wherein the combining the visible light image and the infrared image to obtain the color iris image comprises: segmenting the visible light image to obtain a visible light iris image; segmenting the infrared image to obtain an infrared iris image; spatially transforming the visible light iris image and the infrared iris image, such that the transformed visible light iris image and the transformed infrared iris image are consistent in size and angle; and combining the transformed visible light iris image and the transformed infrared iris image to obtain the color iris image.

Solution 5. The method of solution 3, wherein the combining the visible light image and the infrared image to obtain the color iris image comprises: performing multi-scale transformation on the visible light image to obtain a first low-frequency component and a first high-frequency component set; performing multi-scale decomposition on the infrared image to obtain a second low-frequency component and a second high-frequency component set; performing a weighted operation on the first low-frequency component and the second low-frequency component to obtain a target low-frequency component; and combining the first high-frequency component set and the second high-frequency component set according to a principle of taking neighborhood energy to be large to obtain a target high-frequency component set.

Solution 6. The method of solution 5, wherein the multi-scale decomposition is selected from a group consisting of wavelet transform, Laplace transform, Contourlet Transform (CT), Non-subsampled Contourlet Transform (NSCT) and shear wave transform.

Solution 7. The method of solution 1, wherein the mobile terminal is further provided with an ambient sensor, the method further comprising: acquiring an ambient parameter by using the ambient sensor, wherein compensating, during iris collection for the target object, an iris based on the at least one target compensation parameter to obtain a color iris image comprises: compensating, during iris collection for the target object, an iris based on the at least one target compensation parameter and the ambient parameter to obtain a color iris image.

Solution 8. The method of solution 1, wherein the plurality of compensation parameters are selected from a group consisting of: a collection current during iris collection; a collection voltage during iris collection; collection power during iris collection; and a color correction coefficient according to which color extracted from a collected iris image is corrected.

Solution 9. A mobile terminal, comprising an iris recognition device, a memory, and an Application Processor (AP), both the iris recognition device and the memory being connected to the AP, wherein the iris recognition device is configured to collect color information of a target object; the memory is configured to store a plurality of compensation parameters; and the AP is configured to determine at least one of the plurality of compensation parameters as at least one target compensation parameter corresponding to the color information, and compensate, when the iris recognition device performs iris collection for the target object, an iris based on the at least one target compensation parameter corresponding to the color information to obtain a color iris image.

Solution 10. The mobile terminal of solution 9, wherein in terms of determining at least one of the plurality of compensation parameters as at least one target compensation parameter corresponding to the color information, the AP is specifically configured to: analyze the color information to obtain abnormal color information; determine a target characterization color corresponding to the abnormal color information, the target characterization color indicating real color information of a region of the target object having the abnormal color information; and determine at least one of the plurality of compensation parameters as at least one target compensation parameter corresponding to the target characterization color according to predetermined correspondences between characterization colors and compensation parameters.

Solution 11. The mobile terminal of solution 9, wherein the iris recognition device comprises a visible light camera, an infrared fill light and an infrared camera; and in terms of compensating, during iris collection, an iris based on the at least one target compensation parameter to obtain a color iris image, the iris recognition device is specifically configured to: perform image collection on the target object by using the visible light camera of the iris recognition device according to the at least one target compensation parameter to obtain a visible light image; and perform image collection on the target object by using the infrared fill light under illumination of the infrared camera of the iris recognition device to obtain an infrared image, and instruct the AP to combine the visible light image and the infrared image to obtain the color iris image.

Solution 12. The mobile terminal of solution 11, wherein in terms of combining the visible light image and the infrared image to obtain the color iris image, the AP is specifically configured to: segment the visible light image to obtain a visible light iris image; segment the infrared image to obtain an infrared iris image; spatially transform the visible light iris image and the infrared iris image, such that the transformed visible light iris image and the transformed infrared iris image are consistent in size and angle; and combine the transformed visible light iris image and the transformed infrared iris image to obtain the color iris image.

Solution 13. The mobile terminal of solution 11, wherein wherein in terms of combining the visible light image and the infrared image to obtain the color iris image, the AP is specifically configured to: perform multi-scale transformation on the visible light image to obtain a first low-frequency component and a first high-frequency component set; perform multi-scale decomposition on the infrared image to obtain a second low-frequency component and a second high-frequency component set; perform a weighted operation on the first low-frequency component and the second low-frequency component to obtain a target low-frequency component; and combine the first high-frequency component set and the second high-frequency component set according to a principle of taking neighborhood energy to be large to obtain a target high-frequency component set.

Solution 14. The mobile terminal of solution 13, wherein the multi-scale decomposition is selected from a group consisting of wavelet transform, Laplace transform, Contourlet Transform (CT), Non-subsampled Contourlet Transform (NSCT) and shear wave transform.

Solution 15. The mobile terminal of solution 9, further comprising an ambient sensor, wherein the ambient sensor is configured to acquire an ambient parameter; and in terms of compensating, during iris collection for the target object, an iris based on the at least one target compensation parameter to obtain a color iris image, the iris recognition device is specifically configured to: compensate, during iris collection for the target object, an iris based on the at least one target compensation parameter and the ambient parameter to obtain a color iris image.

Solution 16. The mobile terminal of solution 9, wherein the plurality of compensation parameters are selected from a group consisting of: a collection current during iris collection; a collection voltage during iris collection; collection power during iris collection; and a color correction coefficient according to which color extracted from a collected iris image is corrected.

Solution 17. A non-transitory computer-readable storage medium having stored thereon a computer program which enables a computer to execute a method for processing an image, the method comprising: collecting color information of a target object; determining at least one of a plurality of pre-stored compensation parameters as at least one compensation parameter corresponding to the color information; and compensating, during iris collection for the target object, an iris based on the at least one target compensation parameter to obtain a color iris image.

Solution 18. The non-transitory computer-readable storage medium of solution 17, wherein the determining at least one of a plurality of pre-stored compensation parameters as at least one compensation parameter corresponding to the color information comprises: analyzing the color information to obtain abnormal color information; determining a target characterization color corresponding to the abnormal color information, the target characterization color indicating real color information of a region of the target object having the abnormal color information; and determining at least one of the plurality of compensation parameters as at least one compensation parameter corresponding to the target characterization color according to predetermined correspondences between characterization colors and compensation parameters.

Solution 19. The non-transitory computer-readable storage medium of solution 17, wherein the compensating, during iris collection, an iris based on the at least one target compensation parameter to obtain a color iris image comprises: performing, by a visible light camera, image collection on the target object according to the at least one target compensation parameter to obtain a visible light image; performing, by an infrared camera, image collection on the target object to obtain an infrared image under illumination of an infrared fill light; and combining the visible light image and the infrared image to obtain the color iris image.

Solution 20. The non-transitory computer-readable storage medium of solution 19, wherein the combining the visible light image and the infrared image to obtain the color iris image comprises: segmenting the visible light image to obtain a visible light iris image; segmenting the infrared image to obtain an infrared iris image; spatially transforming the visible light iris image and the infrared iris image, such that the transformed visible light iris image and the transformed infrared iris image are consistent in size and angle; and combining the transformed visible light iris image and the transformed infrared iris image to obtain the color iris image.

Solution 21. The non-transitory, computer-readable storage medium of solution 19, wherein the combining the visible light image and the infrared image to obtain the color iris image comprises: performing multi-scale transformation on the visible light image to obtain a first low-frequency component and a first high-frequency component set; performing multi-scale decomposition on the infrared image to obtain a second low-frequency component and a second high-frequency component set; performing a weighted operation on the first low-frequency component and the second low-frequency component to obtain a target low-frequency component; and combining the first high-frequency component set and the second high-frequency component set according to a principle of taking neighborhood energy to be large to obtain a target high-frequency component set.

Solution 22. The non-transitory computer-readable storage medium of solution 21, wherein the multi-scale decomposition is selected from a group consisting of wavelet transform, Laplace transform, Contourlet Transform (CT), Non-subsampled Contourlet Transform (NSCT) and shear wave transform.

Solution 23. The non-transitory computer-readable storage medium of solution 17, wherein the mobile terminal is further provided with an ambient sensor, the method further comprising: acquiring an ambient parameter by using the ambient sensor, wherein compensating, during iris collection for the target object, an iris based on the at least one target compensation parameter to obtain a color iris image comprises: compensating, during iris collection for the target object, an iris based on the at least one target compensation parameter and the ambient parameter to obtain a color iris image.

Solution 24. The non-transitory computer-readable storage medium of solution 17, wherein the plurality of compensation parameters are selected from a group consisting of: a collection current during iris collection; a collection voltage during iris collection; collection power during iris collection; and a color correction coefficient according to which color extracted from a collected iris image is corrected.

Solution 25. A mobile terminal, comprising an iris recognition device, an Application Processor (AP), and a memory, and one or more programs, wherein the one or more programs are stored in the memory and configured to be executed by the AP, the program comprising instructions for executing the method of any one of solutions 1 to 8.

Solution 26. An image processing device, comprising a color collection unit, a compensation parameter determination unit, and an iris collection unit, wherein the color collection unit is configured to collect color information of a target object; the compensation parameter determination unit is configured to determine a target compensation parameter corresponding to the color information from a plurality of pre-stored compensation parameters; and the iris collection unit is configured to compensate, during iris collection, an iris based on the target compensation parameter to obtain a color iris image.

Solution 27. A computer program product, wherein the computer program product includes a non-transient computer-readable storage medium storing a computer program, the computer program being operable to enable a computer to execute some or all operations according to any one of solutions 1-8.

The mobile terminal involved in the embodiments of the disclosure may include various handheld devices with a wireless communication function, on-board devices, wearable devices, computing devices or other processing devices connected to a wireless modem, and various forms of User Equipment (UE), Mobile Stations (MSs), terminal devices, etc. For convenience of description, the above-mentioned devices are collectively referred to as mobile terminals. The embodiments of the disclosure will be introduced in detail below. FIG. 1A shows an example of a smart phone 100. An iris recognition device of the smart phone 100 may include an infrared fill light 21, an infrared camera 22, and a front camera 23. During operation of the iris recognition device, the light of the infrared fill light 21 is emitted to an iris and then reflected back to the infrared camera 22 through the iris, the iris recognition device collects an iris image, the front camera 23 may be used to collect a visible light image, then the iris image and the visible light image are combined to obtain a final iris image, and the iris image may be displayed to a user.

Figure 1B:
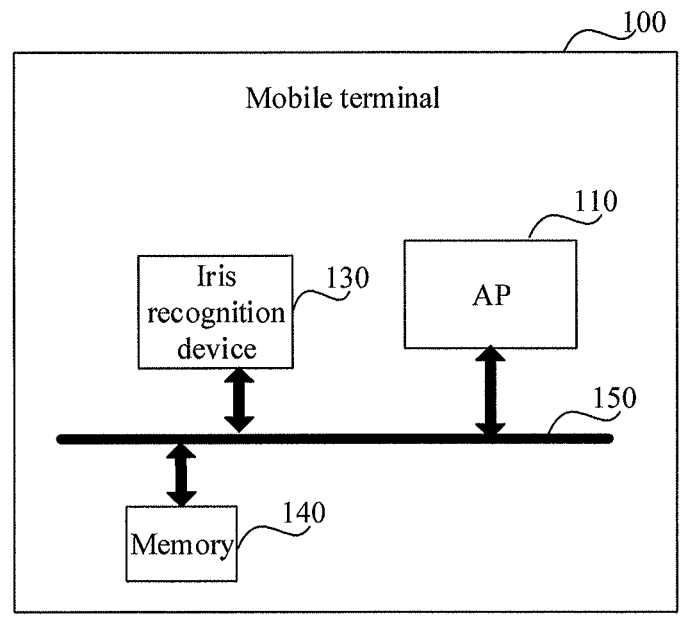
FIG. 1B is a schematic diagram illustrating configuration of a mobile terminal according to an embodiment of the disclosure.
Figure 1C:
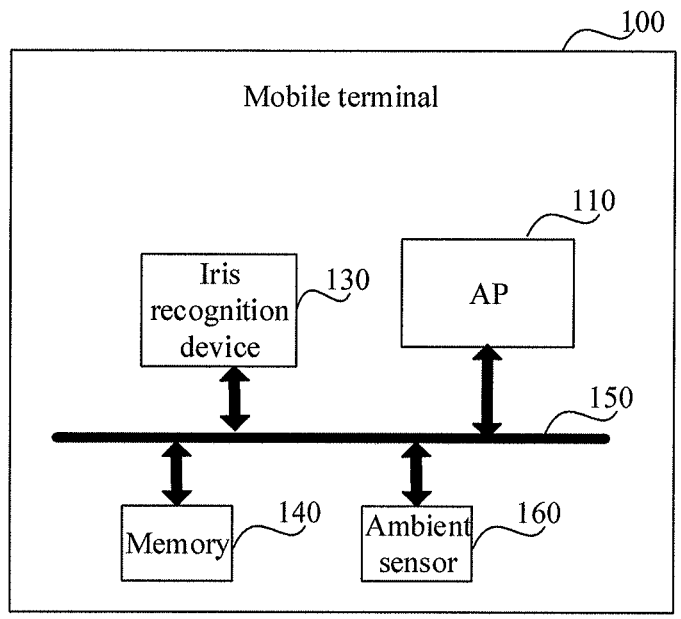
FIG. 1C is a schematic diagram illustrating configuration of another mobile terminal according to an embodiment of the disclosure.

With reference to FIG. 1B, FIG. 1B is a schematic diagram illustrating configuration of a mobile terminal 100 according to an embodiment of the disclosure. The mobile terminal 100 includes an AP 110, an iris recognition device 130, and a memory 140. The iris recognition device 130 may be integrated with a touch display screen. Alternatively, the iris recognition device and the touch display screen may exist independently. Here, the AP 110 is connected to the touch display screen, the iris recognition device 130 and the memory 140 via a bus 150. With reference to FIG. 1C, FIG. 1C is a modified structure of the mobile terminal 100 depicted in FIG. 1B. Compared with FIG. 1B, FIG. 1C further includes an ambient sensor 160.

In some possible embodiments, the iris recognition device 130 is configured to collect color information of a target object, and the memory 140 is configured to store multiple compensation parameters.

The AP 110 is configured to determine a target compensation parameter corresponding to the color information from the multiple compensation parameters, and compensate, when the iris recognition device 130 performs iris collection, an iris based on the target compensation parameter corresponding to the color information to obtain a color iris image.

In some possible embodiments, in terms of determining a target compensation parameter corresponding to the color information from the multiple compensation parameters, the AP 110 is specifically configured to analyze the color information to obtain abnormal color information; determine a target characterization color corresponding to the abnormal color information; and determine a target compensation parameter corresponding to the target characterization color from the multiple compensation parameters according to predetermined correspondences between characterization colors and compensation parameters.

In some possible embodiments, the iris recognition device 130 includes a visible light camera, an infrared fill light and an infrared camera.

In terms of compensating, during iris collection, an iris based on the target compensation parameter to obtain a color iris image, the iris recognition device 130 is specifically configured to perform image collection on the target object by using the visible light camera of the iris recognition device 130 according to the target compensation parameter to obtain a visible light image; and perform image collection on the target object by using the infrared fill light and the infrared camera of the iris recognition device 130 to obtain an infrared image, and instruct the AP 110 to combine the visible light image and the infrared image to obtain the color iris image.

In some possible embodiments, in terms of combining the visible light image and the infrared image to obtain the color iris image, the AP 110 is specifically configured to segment the visible light image to obtain a visible light iris image; segment the infrared image to obtain an infrared iris image; spatially transform the visible light iris image and the infrared iris image, such that the transformed visible light iris image and the transformed infrared iris image are consistent in size and angle; and combine the transformed visible light iris image and the transformed infrared iris image to obtain the color iris image.

In some possible embodiments, the mobile terminal is further provided with an ambient sensor 160.

The ambient sensor 160 is configured to acquire an ambient parameter.

In terms of compensating, during iris collection, an iris based on the target compensation parameter to obtain a color iris image, the iris recognition device 130 is specifically configured to compensate, during iris collection, an iris based on the target compensation parameter and the ambient parameter to obtain a color iris image.

Figure 2:
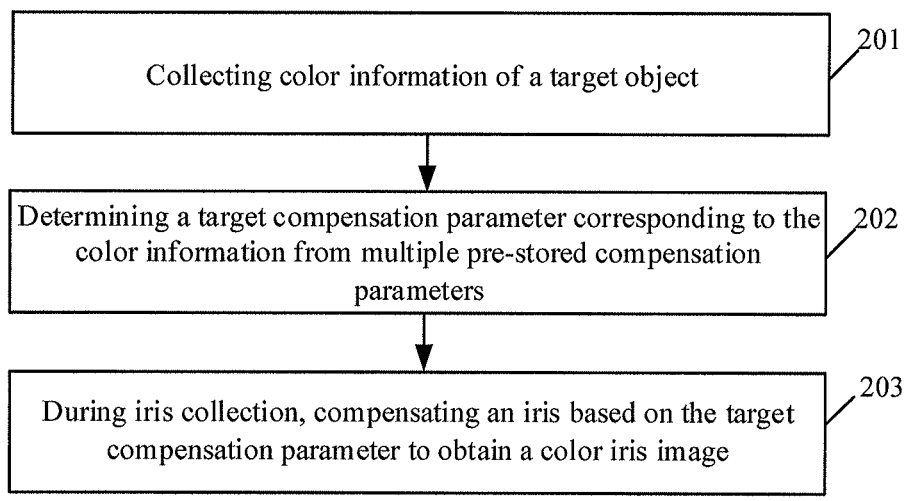
FIG. 2 is a flowchart of a method for processing an image according to an embodiment of the disclosure.

With reference to FIG. 2, FIG. 2 is a flowchart of a method for processing an image according to an embodiment of the disclosure. The method is applied to a mobile terminal including an iris recognition device, a memory and an AP. A physical diagram and a schematic diagram illustrating configuration of the mobile terminal may refer to FIG. 1A to FIG. 1C. The present method for processing an image includes the operations as follows.

At 201, color information of a target object is collected.

Herein, the target object may be a face or an iris, or an object containing an iris. The iris recognition device may be used to collect the color information of the target object. The above-mentioned iris recognition device further includes a visible light camera. The visible light camera is used to acquire a color image corresponding to the target object, and then the color information is extracted from the color image.

At 202, a target compensation parameter corresponding to the color information is determined from multiple pre-stored compensation parameters.

Herein, multiple compensation parameters may be pre-stored in the memory of the mobile terminal. The compensation parameters may include, but are not limited to, an iris collection current, an iris collection voltage, an iris collection power, a color correction coefficient, etc. Here, the iris collection current is a collection current during iris collection. The iris collection voltage is a collection voltage during iris collection. The iris collection power is a collection power during iris collection. The color correction coefficient is a coefficient according to which the color extracted from the collected iris image is corrected. Usually, a color will also be distorted. Therefore, the distorted color needs to be restored, so that the processed color is more natural or vivid. Therefore, a mapping relationship between color information and a compensation parameter may be preset. Further, a target compensation parameter corresponding to the color information obtained in operation 201 may be determined from multiple pre-stored compensation parameters.

In a possible example, the operation that a target compensation parameter corresponding to the color information is determined from multiple pre-stored compensation parameters in operation 202 may include the operations as follows.

At 221, the color information is analyzed to obtain abnormal color information.

At 222, a target characterization color corresponding to the abnormal color information is determined.

At 223, a target compensation parameter corresponding to the target characterization color is determined from the multiple compensation parameters according to predetermined correspondences between characterization colors and compensation parameters.

Herein, the color information is color information of an entire scenario. Combining with the life experience, it can be known that often only a part of the scenario is distorted in color. Therefore, the color information of this part, that is, abnormal color information, may be obtained. The preferred color or the color of a real scenario may be analyzed by using these pieces of abnormal color information, then a target characterization color is obtained. The target characterization color may be understood as the color information of the real scenario. In the memory of the mobile terminal, a corresponding relationship between a characterization color and a compensation parameter may be pre-stored, and further, a target compensation parameter corresponding to the target characterization color may be determined according to the corresponding relationship. The target compensation parameter is one of multiple pre-stored compensation parameters.

At 203, during iris collection, an iris is compensated based on the target compensation parameter and the ambient parameter to obtain a color iris image.

Herein, the colors of iris images obtained by using different compensation parameters are not the same. Therefore, iris collection may be performed on the target object according to the target compensation parameter to obtain a final iris image, and the iris image is a color image.

In a possible example, the iris recognition device includes a visible light camera, an infrared fill light and an infrared camera. The operation that an iris is compensated during iris collection based on the target compensation parameter and the ambient parameter to obtain a color iris image may include the operations as follows.

At 31, image collection is performed on the target object by using a visible light camera according to the target compensation parameter to obtain a visible light image.

At 32, image collection is performed on the target object by using an infrared fill light and an infrared camera to obtain an infrared image.

At 33, the visible light image and the infrared image are combined to obtain the color iris image.

Herein, referring to FIG. 1A to FIG. 1C, the iris recognition device in the embodiments of the disclosure may include a visible light camera, an infrared fill light and an infrared camera. Operation 31 and operation 32 may be executed in parallel. Alternatively, operation 31 is performed first, and then operation 32 is performed. Alternatively, operation 32 is performed first, and then operation 31 is performed. The visible light camera may be controlled to perform image collection on the target object according to the target compensation parameter to obtain a visible light image. The infrared fill light and the infrared camera of the iris recognition device may be controlled to perform image collection on the target object to obtain an infrared image. The visible light image and the infrared image are combined to obtain the color iris image.

Alternatively, the operation that the visible light image and the infrared image are combined to obtain the color iris image in operation 33 may include the operations as follows.

At A1, the visible light image is segmented to obtain a visible light iris image.

At A2, the infrared image is segmented to obtain an infrared iris image.

At A3, the visible light iris image and the infrared iris image are spatially transformed, such that the transformed visible light iris image and the transformed infrared iris image are consistent in size and angle.

At A4, the transformed visible light iris image and the transformed infrared iris image are combined to obtain the color iris image.

Herein, the above-mentioned image segmentation may adopt one of a gray threshold segmentation method, a maximum between-class variance method, a peak-to-valley method of an image grayscale histogram, a minimum error method, a maximum entropy automatic threshold method, a graph theory segmentation method, or the like. The above-mentioned spatial transformation may be affine transformation, rigid transformation, non-rigid transformation, or the like. A visible light image may be segmented to obtain a visible light iris image. An infrared image is segmented to obtain an infrared iris image. The visible light iris image and the infrared iris image are spatially transformed. As such, the transformed visible light iris image and the transformed infrared iris image are consistent in size and angle to facilitate subsequent image combining. The transformed visible light iris image and the transformed infrared iris image are combined to obtain a color iris image. In this way, a final iris image may be obtained.

Alternatively, the operation that the visible light image and the infrared image are combined to obtain the color iris image in operation 33 may include the operations as follows.

At B1, multi-scale transformation is performed on the visible light image to obtain a first low-frequency component and a first high-frequency component set.

At B2, multi-scale decomposition is performed on the infrared image to obtain a second low-frequency component and a second high-frequency component set.

At B3, a weighted operation is performed on the first low-frequency component and the second low-frequency component to obtain a target low-frequency component.

At B4, the first high-frequency component set and the second high-frequency component set are combined according to a principle of taking neighborhood energy to be large, so as to obtain a target high-frequency component set.

At B5, multi-scale reverse transformation is performed on the target low-frequency component and the target high-frequency component set to obtain the color iris image.

Herein, a multi-scale decomposition algorithm may be used to perform multi-scale transformation on a visible light image to obtain a first low-frequency component and a first high-frequency component set. The first high-frequency component set may include multiple high-frequency components. The multi-scale decomposition algorithm may include, but is not limited to, wavelet transform, Laplace transform, Contourlet Transform (CT), Non-subsampled Contourlet Transform (NSCT), shear wave transform, etc. Taking CT as an example, multi-scale decomposition is performed on a visible light image by using CT to obtain a low-frequency component and multiple high-frequency components, and each of the multiple high-frequency components is of a different size. Taking NSCT as an example, multi-scale decomposition is performed on a visible light image by using NSCT to obtain a low-frequency component and multiple high-frequency components, and each of the multiple high-frequency components is of the same size. High-frequency components contain more details about an original image. Similarly, a multi-scale decomposition algorithm may be used to perform multi-scale decomposition on an infrared image to obtain a second low-frequency component and a second high-frequency component set. The neighborhood may be a neighborhood of a specified size such as 3*3, 5*5, 7*7, and 11*11. Based on the neighborhood, a correlation between surrounding pixel points can be fully considered, and thus more details can be retained. In the combination process of high-frequency components, pixel points at a corresponding position are combined by using a principle of taking neighborhood energy to be large. The position of the first high-frequency component image corresponds to the position of the second high-frequency component, i.e., the layer position and the scale position therebetween are the same. For example, if the first high-frequency component image is located at a second layer and a third scale, the second high-frequency component image is also located at the second layer and the third scale. For example, at a position A, energy corresponding to a high-frequency component of an infrared image is 10, and energy corresponding to a high-frequency component of visible light is 11, so a high-frequency coefficient corresponding to the high-frequency component of the visible light is selected at the position A. Specifically, B1 and B2 may be executed in parallel, or executed in sequence. Multi-scale transformation may be performed on a visible light image to obtain a first low-frequency component and a first high-frequency component set, multi-scale decomposition is performed on an infrared image to obtain a second low-frequency component and a second high-frequency component set, the AP is controlled to perform a weighted operation on the first low-frequency component and the second low-frequency component to obtain a target low-frequency component, the first high-frequency component set and the second high-frequency component set are combined according to a principle of taking neighborhood energy to be large, so as to obtain a target high-frequency component set, the AP is controlled to perform multi-scale reverse transformation on the target low-frequency component and the target high-frequency component set to obtain a color iris image, and the obtained iris image is a color iris image and can be better viewed by a user.

It can be seen that in the embodiments of the disclosure, color information of a target object is collected, a target compensation parameter corresponding to the color information is determined from multiple pre-stored compensation parameters, and iris collection is performed on the target object according to the target compensation parameter to obtain a color iris image. It is apparent that a corresponding compensation parameter may be acquired by using color information of a target object, then iris collection is performed according to the compensation parameter, and finally, a color iris image may be obtained. The display effect is better.

Figure 3:
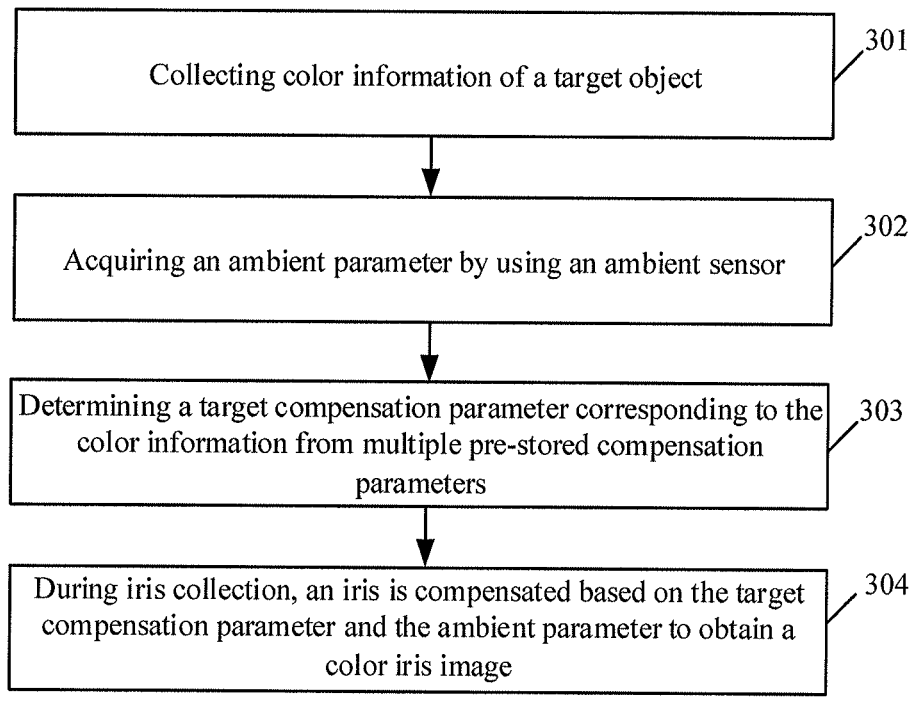
FIG. 3 is a flowchart of another method for processing an image according to an embodiment of the disclosure.

With reference to FIG. 3, FIG. 3 is a flowchart of a method for processing an image according to an embodiment of the disclosure. The method is applied to a mobile terminal including an iris recognition device, a memory and an AP. A physical diagram and a schematic diagram illustrating configuration of the mobile terminal may refer to FIG. 1C. The present method for processing an image includes the operations as follows.

At 301, color information of a target object is collected.

At 302, an ambient parameter is acquired by using an ambient sensor.

Herein, operation 301 and operation 302 may be executed in parallel, or operation 301 is performed first, and then operation 302 is performed, or operation 302 is performed first, and then operation 301 is performed.

Alternatively, the above-mentioned ambient sensor may be an ambient light sensor for detecting ambient brightness, or the ambient sensor may be a magnetic field sensor for detecting magnetic field intensity; the ambient sensor may be a humidity sensor for detecting ambient humidity, or the ambient sensor may be a temperature sensor for detecting ambient temperature. Here, a mapping relationship between an ambient parameter and an iris collection parameter may be preset. After a current ambient parameter is determined, an iris collection parameter corresponding to the current ambient parameter may be determined according to the mapping relationship. The above-mentioned iris collection parameter may include, but is not limited to, a collection current, a collection voltage, etc.

At 303, a target compensation parameter corresponding to the color information is determined from multiple pre-stored compensation parameters.

At 304, during iris collection, an iris is compensated based on the target compensation parameter and the ambient parameter to obtain a color iris image.

Herein, a mapping relationship among a target compensation parameter, an ambient parameter and an iris collection parameter may be preset, the target compensation parameter in operation 303 and the iris collection parameter corresponding to the ambient parameter in operation 302 may be determined according to the mapping relationship, and further, iris collection is performed according to the iris collection parameter to obtain a color iris image. The above-mentioned iris collection parameter may include, but is not limited to, a collection current, a collection voltage, etc.

It can be seen that in the embodiments of the disclosure, color information of a target object is collected, a target compensation parameter corresponding to the color information is determined from multiple pre-stored compensation parameters, and iris collection is performed on the target object according to the target compensation parameter and an ambient parameter to obtain a color iris image. It is apparent that a corresponding compensation parameter may be acquired by using color information of a target object, then iris collection is performed according to the compensation parameter, and finally, a color iris image may be obtained. The display effect is better.

Figure 4:
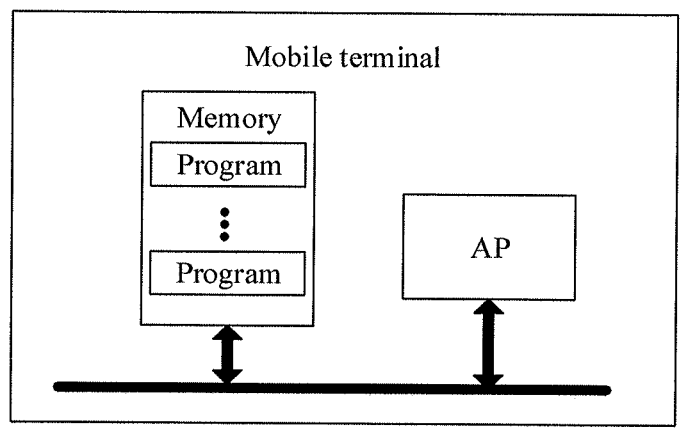
FIG. 4 is a schematic diagram illustrating configuration of another mobile terminal according to an embodiment of the disclosure.

Please refer to FIG. 4. FIG. 4 is a mobile terminal according to an embodiment of the disclosure. The mobile terminal mainly includes an AP and a memory, and may further include an iris recognition device and one or more programs, the one or more programs being stored in the memory and configured to be executed by the AP, the program including instructions for executing the operations as follows.

Color information of a target object is collected.

A target compensation parameter corresponding to the color information is determined from multiple pre-stored compensation parameters.

During iris collection, an iris is compensated based on the target compensation parameter and an ambient parameter to obtain a color iris image.

In a possible example, in terms of determining a target compensation parameter corresponding to the color information from the multiple compensation parameters, the program includes instructions for executing the operations as follows.

The color information is analyzed to obtain abnormal color information.

A target characterization color corresponding to the abnormal color information is determined.

A target compensation parameter corresponding to the target characterization color is determined from the multiple compensation parameters according to predetermined correspondences between characterization colors and compensation parameters.

In a possible example, the iris recognition device includes a visible light camera, an infrared fill light and an infrared camera. In terms of compensating, during iris collection, an iris based on the target compensation parameter to obtain a color iris image, the program includes instructions for executing the operations as follows.

Image collection is performed on the target object by using the visible light camera according to the target compensation parameter to obtain a visible light image.

Image collection is performed on the target object by using the infrared fill light and the infrared camera to obtain an infrared image.

The visible light image and the infrared image are combined to obtain the color iris image.

In a possible example, in terms of combining the visible light image and the infrared image to obtain the color iris image, the program includes instructions for executing the operations as follows.

The visible light image is segmented to obtain a visible light iris image.

The infrared image is segmented to obtain an infrared iris image.

The visible light iris image and the infrared iris image are spatially transformed, such that the transformed visible light iris image and the transformed infrared iris image are consistent in size and angle.

The transformed visible light iris image and the transformed infrared iris image are combined to obtain the color iris image.

In a possible example, the mobile terminal is further provided with an ambient sensor, and the program further includes instructions for executing the operations as follows.

An ambient parameter is acquired by using the ambient sensor.

In terms of compensating, during iris collection, an iris based on the target compensation parameter to obtain a color iris image, the program further includes instructions for executing the operation as follows.

During iris collection, an iris is compensated based on the target compensation parameter and the ambient parameter to obtain a color iris image.

Figure 5A:
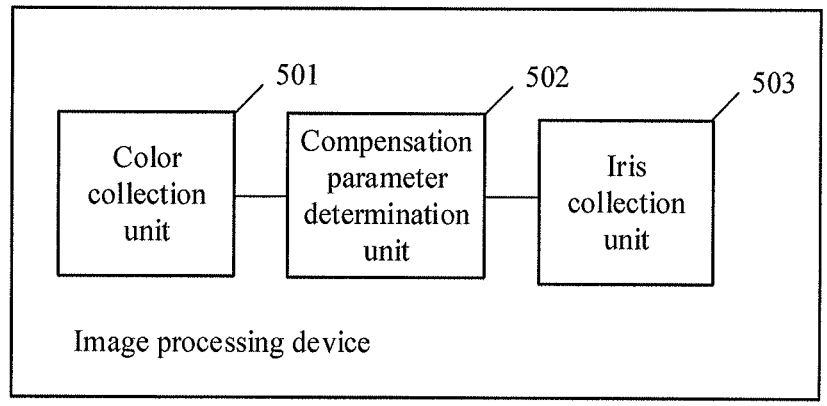
FIG. 5A is a schematic diagram illustrating configuration of an image processing device according to an embodiment of the disclosure.

With reference to FIG. 5A, FIG. 5A is a schematic diagram illustrating configuration of an image processing device according to the present embodiment.

The image processing device is applied to a mobile terminal, and the image processing device includes a color collection unit 501, a compensation parameter determination unit 502 and an iris collection unit 503.

The color collection unit 501 is configured to collect color information of a target object.

The compensation parameter determination unit 502 is configured to determine a target compensation parameter corresponding to the color information from multiple pre-stored compensation parameters.

The iris collection unit 503 is configured to compensate, during iris collection, an iris based on the target compensation parameter and an ambient parameter to obtain a color iris image.

Figure 5B:
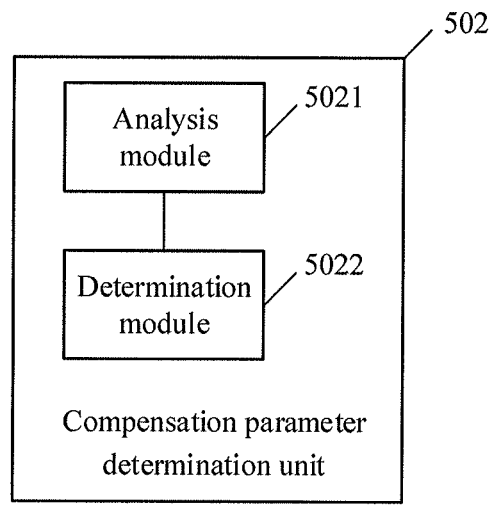
FIG. 5B is a schematic diagram illustrating configuration of a compensation parameter determination unit of the image processing device depicted in FIG. 5A according to an embodiment of the disclosure.

Alternatively, as illustrated in FIG. 5B, FIG. 5B is a specific detailed structure of the compensation parameter determination unit 502 of the image processing device depicted in FIG. 5A. The compensation parameter determination unit 502 may include an analysis module 5021 and a determination module 5022, specifically as follows.

The analysis module 5021 is configured to analyze the color information to obtain abnormal color information.

The determination module 5022 is configured to determine a target characterization color corresponding to the abnormal color information.

The determination module 5022 is further configured to determine a target compensation parameter corresponding to the target characterization color from the multiple compensation parameters according to predetermined correspondences between characterization colors and compensation parameters.

Figure 5C:
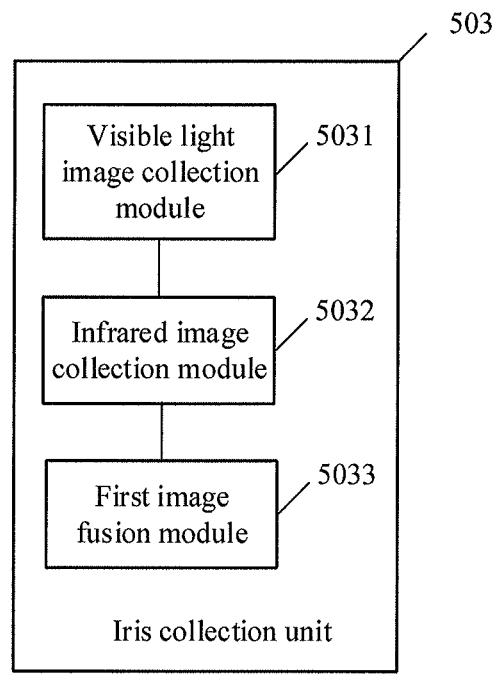
FIG. 5C is a schematic diagram illustrating configuration of an iris collection unit of the image processing device depicted in FIG. 5A according to an embodiment of the disclosure.

Alternatively, as illustrated in FIG. 5C, FIG. 5C is a specific detailed structure of the iris collection unit 503 of the image processing device depicted in FIG. 5A. The iris recognition device includes a visible light camera, an infrared fill light and an infrared camera. The iris collection unit 503 may include a visible light image collection module 5031, an infrared image collection module 5032 and a first image combining module 5033, specifically as follows.

The visible light image collection module 5031 is configured to perform image collection on the target object by using the visible light camera according to the target compensation parameter to obtain a visible light image.

The infrared image collection module 5032 is configured to perform image collection on the target object by using the infrared fill light and the infrared camera to obtain an infrared image.

The first image combining module 5033 is configured to combine the visible light image and the infrared image to obtain the color iris image.

Figure 5D:
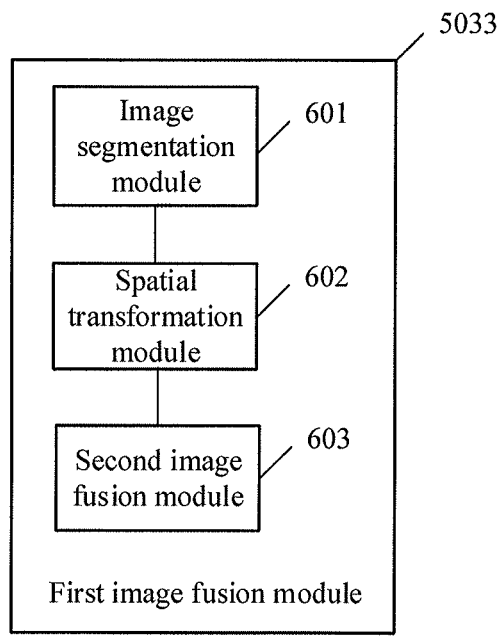
FIG. 5D is a schematic diagram illustrating configuration of a first image combining module of the iris collection unit depicted in FIG. 5C according to an embodiment of the disclosure.

Alternatively, as illustrated in FIG. 5D, FIG. 5D is a specific detailed structure of the first image combining module 5033 depicted in FIG. 5C. The first image combining module 5033 may include an image segmentation module 601, a spatial transformation module 602 and a second image combining module 603, specifically as follows.

The image segmentation module 601 is configured to segment the visible light image to obtain a visible light iris image.

The image segmentation module 601 is further configured to segment the infrared image to obtain an infrared iris image.

The spatial transformation module 602 is configured to spatially transform the visible light iris image and the infrared iris image, such that the transformed visible light iris image and the transformed infrared iris image are consistent in size and angle.

The second image combining module 603 is configured to combine the transformed visible light iris image and the transformed infrared iris image to obtain the color iris image.

Figure 5E:
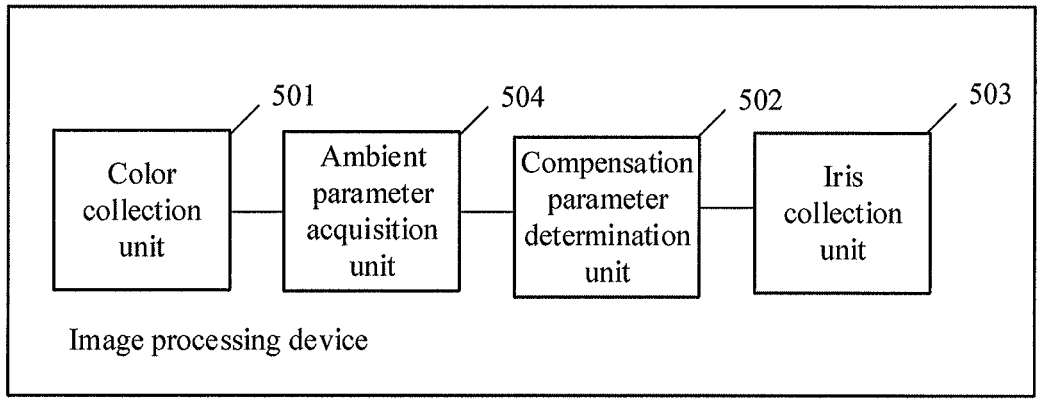
FIG. 5E is a schematic diagram illustrating another configuration of the image processing device depicted in FIG. 5A according to an embodiment of the disclosure.

Alternatively, as illustrated in FIG. 5E, FIG. 5E is another modified structure of the image processing device depicted in FIG. 5A. Compared with FIG. 5A, the image processing device depicted in FIG. 5E further includes an ambient parameter acquisition unit 504, and the mobile terminal is further provided with an ambient sensor, specifically as follows.

The ambient parameter acquisition unit 504 is configured to acquire an ambient parameter.

The iris collection unit 503 is specifically configured to compensate, during iris collection, an iris based on the target compensation parameter and the ambient parameter to obtain a color iris image.

It can be seen that the image processing device described in the embodiments of the disclosure collects color information of a target object, determines a target compensation parameter corresponding to the color information from multiple pre-stored compensation parameters, and performs iris collection on the target object according to the target compensation parameter to obtain a color iris image. It is apparent that a corresponding compensation parameter may be acquired by using color information of a target object, then iris collection is performed according to the compensation parameter, and finally, a color iris image may be obtained. The viewing value of an iris image can be improved.

It can be understood that the functions of all program modules of the image processing device in the present embodiment may be specifically implemented according to the method in the above-mentioned method embodiments. For a specific implementation process thereof, reference may be made to the related description of the above-mentioned method embodiments, and details are not described herein again.

Figure 6:
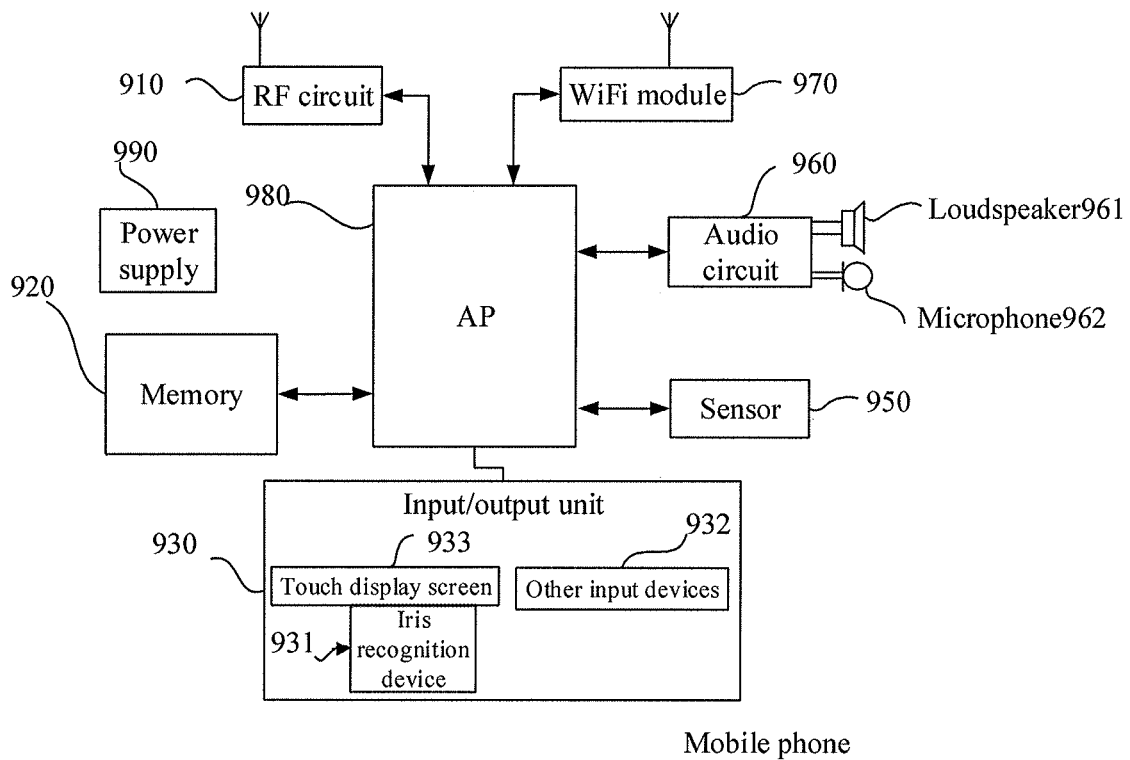
FIG. 6 is a schematic diagram illustrating configuration of yet another mobile terminal according to an embodiment of the disclosure.

The embodiments of the disclosure also provide another mobile terminal, as illustrated in FIG. 6. For convenience of description, only parts associated with the embodiments of the disclosure are shown. Specific technical details that are not disclosed refer to parts of the method in the embodiments of the disclosure. The mobile terminal may be any terminal device including a mobile phone, a tablet computer, a Personal Digital Assistant (PDA), a Point of Sales (POS) and an on-board computer. A mobile phone is taken as the mobile terminal.

FIG. 6 shows a partial structure diagram illustrating a mobile phone associated with a mobile terminal according to an embodiment of the disclosure. Referring to FIG. 6, the mobile phone includes an RF circuit 910, a memory 920, an input unit 930, a display unit 940, a sensor 950, an audio circuit 960, a Wireless Fidelity (WiFi) module 970, an AP 980, a power supply 990, and other parts. A person skilled in the art may understand that a mobile phone structure illustrated in FIG. 6 is not limitative to the mobile phone, and the mobile phone may include parts more or fewer than those illustrated in the figure, or combine some parts, or have different part arrangements.

Each component of the mobile phone will be specifically introduced below in conjunction with FIG. 6.

The input unit 930 may be configured to receive input digital or character information and generate key signal input associated with user setting and functional control of the mobile phone. Specifically, the input unit 930 may include a touch display screen 933, an iris recognition device 931 and other input devices 932. Specifically, the other input devices 932 may include, but are not limited to, one or more of a physical keyboard, a functional key (such as a volume control key and a switch key), a track ball, a mouse and an operating rod.

Herein, the AP 980 is specifically configured to execute the operations as follows.

Color information of a target object is collected.

A target compensation parameter corresponding to the color information is determined from multiple pre-stored compensation parameters.

During iris collection, an iris is compensated based on the target compensation parameter to obtain a color iris image.

The AP 980 is a control center of the mobile phone, and is configured to connect all parts of the whole mobile phone by utilizing various interfaces and lines, to run or execute the software program and/or the module stored in the memory 920, and to call data stored in the memory 920 to execute various functions and processing data of the mobile phone, so as to wholly monitor the mobile phone. Alternatively, the AP 980 may include one or more processing units. Alternatively, the AP 980 may be integrated with an application processor and a modulation-demodulation processor. Here, the application processor mainly processes an operation system, a user interface, an application program and the like, and the modulation-demodulation processor mainly processes wireless communication. It may be understood that the modulation-demodulation processor may not be integrated into the AP 980.

In addition, the memory 920 may include a high-speed random access memory, and may further include a non-volatile memory such as a disk storage device, a flash device, or other non-volatile solid storage devices.

The RF circuit 910 may be configured to receive and transmit information. Usually, the RF circuit 910 includes, but not limited to, an antenna, at least one amplifier, a transceiver, a coupler, a Low Noise Amplifier (LNA), a duplexer, etc. In addition, the RF circuit 910 may further communicate with other devices via wireless communication and a network. The wireless communication may use any one communication standard or protocol, including, but not limited to, a Global System of Mobile communication (GSM), General Packet Radio Service (GPRS), Code Division Multiple Access (CDMA), Wideband Code Division Multiple Access (WCDMA), Long Term Evolution (LTE), an E-mail, Short Messaging Service (SMS), etc.

The mobile phone may further include at least one sensor 950 such as a light sensor, a motion sensor and other sensors. Specifically, the light sensor may include an ambient light sensor and a proximity sensor. Here, the ambient light sensor may adjust the luminance of the touch display screen according to the brightness of ambient light, and the proximity sensor may close the touch display screen and/or backlight. As one of the motion sensors, an accelerometer sensor may detect the magnitude of an accelerated speed in each direction (generally, three-axis), the size and direction of a gravity may be detected while resting, and the accelerometer sensor may be configured to identify an APP of a mobile phone gesture (e.g., horizontal and vertical screen switching, relevant games, and magnetometer gesture calibration), and vibration identification relevant functions (e.g., pedometer and knocking). Other sensors such as a gyroscope sensor, a barometer sensor, a hygrometer sensor, a thermometer sensor and an infrared sensor configurable for the mobile phone will not be elaborated herein.

The audio circuit 960, a loudspeaker 961 and a microphone 962 may provide an audio interface between the user and the mobile phone. The audio circuit 960 may transmit an electric signal converted from the received audio data to the loudspeaker 961, and the loudspeaker 961 converts the electric signal into a sound signal for output. Besides, the microphone 962 converts a collected sound signal into an electric signal, the audio circuit 960 converts the received electric signal into audio data and then outputs the audio data to the AP 980 for processing, the audio data is transmitted to another mobile phone via the RF circuit 910, or the audio data is output to the memory 920 for further processing.

WiFi belongs to a short-range wireless transmission technology, the mobile phone may assist the user in E-mail receiving and sending, webpage browsing, access to streaming media and the like by using the WiFi module 970, and it provides a wireless wideband internet access for the user. Although FIG. 6 shows the WiFi module 970, it may be understood that the WiFi module does not belong to necessary components of the mobile phone and can be totally omitted without changing the essence of the disclosure as required.

The mobile phone furthers include a power supply 990 (such as a battery) for supplying power to each component. Alternatively, the power supply may be connected with the AP 980 logically via a power supply management system, so as to implement functions of charging, discharging and power consumption management by using the power supply management system.

Although not shown, the mobile phone may also include a camera, a Bluetooth module, etc., and will not be elaborated herein.

In the embodiments illustrated in FIG. 2 and FIG. 3, each operation method flow may be implemented based on the structure of the mobile phone.

In the embodiments illustrated in FIG. 4, and FIG. 5A to FIG. 5E, each unit function may be implemented based on the structure of the mobile phone.

The embodiments of the disclosure also provide a computer storage medium. Here, the computer storage medium stores a computer program which enables a computer to execute some or all operations of any method for processing an image in the above-mentioned method embodiment.

The embodiments of the disclosure also provide a computer program product, which includes a non-transient computer-readable storage medium storing a computer program. Here, the computer program is operable to enable a computer to execute some or all operations of any method for processing an image in the above-mentioned method embodiment.

It is important to note that for simple description, each of the above-mentioned method embodiments is expressed as a series of action combinations. However, a person skilled in the art should learn of that the disclosure is not limited by a described action sequence. That is because some operations may be executed in other sequences or at the same time according to the disclosure. Secondly, a person skilled in the art should also learn of that the embodiments described in the specification fall within preferable embodiments, and involved actions and modules may not be necessary for the disclosure.

In the above-mentioned embodiments, descriptions for each embodiment are emphasized respectively, and parts which are not elaborated in a certain embodiment may refer to relevant descriptions for other embodiments.

In some embodiments provided by the present application, it should be understood that the disclosed apparatus may be implemented in another manner. For example, the apparatus embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The above-mentioned units described as separate parts may or may not be physically separated, and parts displayed as units may or may not be physical units, and namely may be located in the same place, or may also be distributed to multiple network units. Part or all of the units may be selected to achieve the purpose of the solutions of the present embodiment according to a practical requirement.

In addition, each function unit in each embodiment of the disclosure may be integrated into a processing unit, each unit may also exist independently, and two or more than two units may also be integrated into a unit. The above-mentioned integrated unit may be implemented in a form of hardware, and may also be implemented in a form of software function unit.

When being implemented in form of software function unit and sold or used as an independent product, the integrated unit may also be stored in a computer-readable storage medium. Based on such an understanding, the technical solutions of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The above-mentioned memory includes various media capable of storing program codes such as a U disk, a Read-Only Memory (ROM), a Random Access Memory (RAM), a mobile hard disk, a magnetic disk or an optical disk.

Those of ordinary skill in the art may understand that all or some operations in each method in the above-mentioned embodiments may be completed by instructing relevant hardware through a program. Here, the program may be stored in a computer-readable memory, and the memory may include: a flash disk, an ROM, an RAM, a magnetic disk or an optical disk.

The embodiments of the disclosure have been described in detail above, and the principles and the implementation manners of the disclosure have been described in specific examples herein. The above-mentioned embodiments are only used to help understand the method and the core idea of the disclosure. Meanwhile, those of ordinary skill in the art, based on the idea of the disclosure, will have changes in specific implementation manners and application ranges. In summary, the contents of this specification should not be construed as limiting the disclosure.

The invention claimed is:

1. A method for processing an image, comprising:
collecting color information of a target object;
determining a target compensation parameter corresponding to the color information from a plurality of pre-stored compensation parameters; and
compensating, during iris collection, an iris based on the target compensation parameter to obtain a color iris image,
wherein the determining a target compensation parameter corresponding to the color information from a plurality of pre-stored compensation parameters comprises:
analyzing the color information to obtain abnormal color information;
determining a target characterization color corresponding to the abnormal color information; and
determining a target compensation parameter corresponding to the target characterization color from the plurality of compensation parameters according to predetermined correspondences between characterization colors and compensation parameters.

2. The method as claimed in claim 1, wherein the compensating, during iris collection, an iris based on the target compensation parameter to obtain a color iris image comprises:
performing, by a visible light camera, image collection on the target object according to the target compensation parameter to obtain a visible light image;
performing, by an infrared camera and an infrared fill light, image collection on the target object to obtain an infrared image; and
combining the visible light image and the infrared image to obtain the color iris image.

3. The method as claimed in claim 2, wherein the combining the visible light image and the infrared image to obtain the color iris image comprises:
segmenting the visible light image to obtain a visible light iris image;
segmenting the infrared image to obtain an infrared iris image;
spatially transforming the visible light iris image and the infrared iris image, such that the transformed visible light iris image and the transformed infrared iris image are consistent in size and angle; and
combining the transformed visible light iris image and the transformed infrared iris image to obtain the color iris image.

4. The method as claimed in claim 1, wherein the mobile terminal is further provided with an ambient sensor, the method further comprising:
acquiring an ambient parameter by using the ambient sensor, wherein
compensating, during iris collection, an iris based on the target compensation parameter to obtain a color iris image comprises:
compensating, during iris collection, an iris based on the target compensation parameter and the ambient parameter to obtain a color iris image.

5. A mobile terminal, comprising an iris recognition device, a memory, and an Application Processor (AP), both the iris recognition device and the memory being connected to the AP, wherein
the iris recognition device is configured to collect color information of a target object;
the memory is configured to store a plurality of compensation parameters; and
the AP is configured to determine a target compensation parameter corresponding to the color information from the plurality of compensation parameters, and compensate, when the iris recognition device performs iris collection, an iris based on the target compensation parameter corresponding to the color information to obtain a color iris image,
wherein in terms of determining a target compensation parameter corresponding to the color information from the plurality of compensation parameters, the AP is specifically configured to:
analyze the color information to obtain abnormal color information; determine a target characterization color corresponding to the abnormal color information; and
determine a target compensation parameter corresponding to the target characterization color from the plurality of compensation parameters according to predetermined correspondences between characterization colors and compensation parameters.

6. The mobile terminal as claimed in claim 5, wherein the iris recognition device comprises a visible light camera, an infrared fill light and an infrared camera; and
in terms of compensating, during iris collection, an iris based on the target compensation parameter to obtain a color iris image, the iris recognition device is specifically configured to:
perform image collection on the target object by using the visible light camera of the iris recognition device according to the target compensation parameter to obtain a visible light image; and
perform image collection on the target object by using the infrared fill light and the infrared camera of the iris recognition device to obtain an infrared image, and instruct the AP to combine the visible light image and the infrared image to obtain the color iris image.

7. The mobile terminal as claimed in claim 6, wherein in terms of combining the visible light image and the infrared image to obtain the color iris image, the AP is specifically configured to:
segment the visible light image to obtain a visible light iris image; segment the infrared image to obtain an infrared iris image; spatially transform the visible light iris image and the infrared iris image, such that the transformed visible light iris image and the transformed infrared iris image are consistent in size and angle; and combine the transformed visible light iris image and the transformed infrared iris image to obtain the color iris image.

8. The mobile terminal as claimed in claim 5, further comprising an ambient sensor, wherein
the ambient sensor is configured to acquire an ambient parameter; and
in terms of compensating, during iris collection, an iris based on the target compensation parameter to obtain a color iris image, the iris recognition device is specifically configured to:
compensate, during iris collection, an iris based on the target compensation parameter and the ambient parameter to obtain a color iris image.

9. A non-transitory computer-readable storage medium having stored thereon a computer program which enables a computer to execute a method for processing an image, the method comprising:
collecting color information of a target object;

determining a target compensation parameter corresponding to the color information from a plurality of pre-stored compensation parameters; and compensating, during iris collection, an iris based on the target compensation parameter to obtain a color iris image, wherein the determining a target compensation parameter corresponding to the color information from a plurality of pre-stored compensation parameters comprises:

analyzing the color information to obtain abnormal color information;

determining a target characterization color corresponding to the abnormal color information; and determining a target compensation parameter corresponding to the target characterization color from the plurality of compensation parameters according to predetermined correspondences between characterization colors and compensation parameters.

10. The non-transitory computer-readable storage medium as claimed in claim 9, wherein the compensating, during iris collection, an iris based on the target compensation parameter to obtain a color iris image comprises:

performing, by a visible light camera, image collection on the target object according to the target compensation parameter to obtain a visible light image;

performing, by an infrared camera and an infrared fill light, image collection on the target object to obtain an infrared image; and combining the visible light image and the infrared image to obtain the color iris image.

11. The non-transitory computer-readable storage medium as claimed in claim 10, wherein the combining the visible light image and the infrared image to obtain the color iris image comprises:

segmenting the visible light image to obtain a visible light iris image;

segmenting the infrared image to obtain an infrared iris image;

spatially transforming the visible light iris image and the infrared iris image, such that the transformed visible light iris image and the transformed infrared iris image are consistent in size and angle; and combining the transformed visible light iris image and the transformed infrared iris image to obtain the color iris image.

12. The non-transitory computer-readable storage medium as claimed in claim 9, wherein the mobile terminal is further provided with an ambient sensor, the method further comprising:

acquiring an ambient parameter by using the ambient sensor, wherein compensating, during iris collection, an iris based on the target compensation parameter to obtain a color iris image comprises:

compensating, during iris collection, an iris based on the target compensation parameter and the ambient parameter to obtain a color iris image.

* * * * *